United States Patent [19]
Robinson

[11] Patent Number: 5,317,721
[45] Date of Patent: May 31, 1994

[54] METHOD AND APPARATUS TO DISABLE ISA DEVICES FOR EISA ADDRESSES OUTSIDE THE ISA RANGE

[75] Inventor: Thomas N. Robinson, Stevensville, Mich.

[73] Assignee: Zenith Data Systems Corporation, Buffalo Grove, Ill.

[21] Appl. No.: 432,688

[22] Filed: Nov. 6, 1989

[51] Int. Cl.$^5$ .......................................... G06F 13/00
[52] U.S. Cl. ..................... 395/500; 395/325; 395/250; 364/DIG. 1; 364/240; 364/240.8; 364/240.3
[58] Field of Search ............... 395/400, 500, 250, 425, 395/325

[56] References Cited

U.S. PATENT DOCUMENTS

| | | | |
|---|---|---|---|
| 4,829,420 | 5/1989 | Stähle | 364/200 |
| 5,043,877 | 8/1991 | Berger et al. | 364/200 |
| 5,101,492 | 3/1992 | Schultz et al. | 395/575 |
| 5,111,423 | 5/1992 | Kopec, Jr. et al. | 395/500 |
| 5,123,092 | 6/1992 | Buxton et al. | 395/250 |

Primary Examiner—Alyssa H. Bowler
Assistant Examiner—L. Donaghue
Attorney, Agent, or Firm—Flynn, Thiel, Boutell & Tanis

[57] ABSTRACT

A computer system includes a system bus having a plurality of address lines and having a first control line. A connector is coupled to the address lines and the first control line, and can removably receive a circuit card which can accept and/or generate signals on the address lines and first control line. A bus control circuit is coupled to the address lines and to a second control line, and can accept and/or generate signals on the address lines and second control line. A signal blocking circuit is coupled to both of the control lines and to the address lines, responds to the occurrence of a control signal on the second control line by respectively effecting and inhibiting application of the control signal to the first control line when the address on the address lines is respectively within and outside a predetermined group of addresses, and responds to the occurrence of the control signal on the first control line by applying the control signal to the second control line regardless of the address on the address lines.

3 Claims, 5 Drawing Sheets

METHOD AND APPARATUS TO DISABLE ISA DEVICES FOR EISA ADDRESSES OUTSIDE THE ISA RANGE

FIELD OF THE INVENTION

This invention relates to a method and apparatus for ensuring compatibility of existing memory devices with an extended memory addressing scheme and, more particularly, to a method and apparatus for selectively inhibiting operation of existing memory devices when a memory address is not within a predetermined group of memory addresses.

BACKGROUND OF THE INVENTION

For several years, commercially available personal computers of the type commonly referred to as IBM compatible have typically used a standard system bus design commonly referred to as the Industry Standard Architecture (ISA). The ISA specification provides for twentyfour memory address lines. Now, systems are being introduced which utilize a system bus design which is an enhanced version of the ISA approach, commonly referred to as the Extended Industry Standard Architecture (EISA). The EISA standard provides for thirty-two address lines.

Existing circuit boards designed for use with the ISA standard can be used with an EISA system, but look at only the twenty-four least significant bits of the thirty-two EISA address lines, and thus ignore the eight most significant address bits. Consequently, where an ISA device, which is designed to respond to a particular combination of the twenty-four least significant bits and thus a unique address under the ISA standard, is used in an EISA system, it could potentially respond to several EISA memory addresses which have the same twenty-four least significant bits but different combinations of the eight most significant bits. An ISA device which responds to multiple EISA addresses in this manner could cause errors.

An integrated circuit is commercially available and can be used to control an EISA system bus. This integrated circuit produces certain control signals which are intended exclusively for use by ISA devices and which could thus be suppressed if an EISA address was outside the range of normal ISA addresses, but the design of the integrated circuit happens to be such that it does not do this and thus presents the potential for errors of the type discussed above. Of course, it would be possible to use, instead of this integrated circuit, a custom circuit made of discrete components and performing the same function, but this approach would involve significant additional cost, space and power consumption.

It is therefore an object of the present invention to provide a way of facilitating use of ISA devices in association with this EISA integrated circuit in a manner ensuring system operation free of errors.

The objects and purposes of the invention are met, for a system which includes first and second control lines and a plurality of address lines, by providing a method and apparatus which involve supplying an address to the address lines and a control signal to one of the control lines, monitoring the address lines and control lines, responding to detection of the control signal on the second control line by respectively effecting and inhibiting application of the control signal to the first control line when the address on the address lines is respectively within and outside a predetermined group of addresses, and responding to the occurrence of the control signal on the first control line by applying the control signal to the second control line regardless of the address on the address lines.

BRIEF DESCRIPTION OF THE DRAWINGS

A preferred embodiment of the present invention will be described in detail hereinafter with reference to the accompanying drawings, in which.

DETAILED DESCRIPTION

Figure 1:
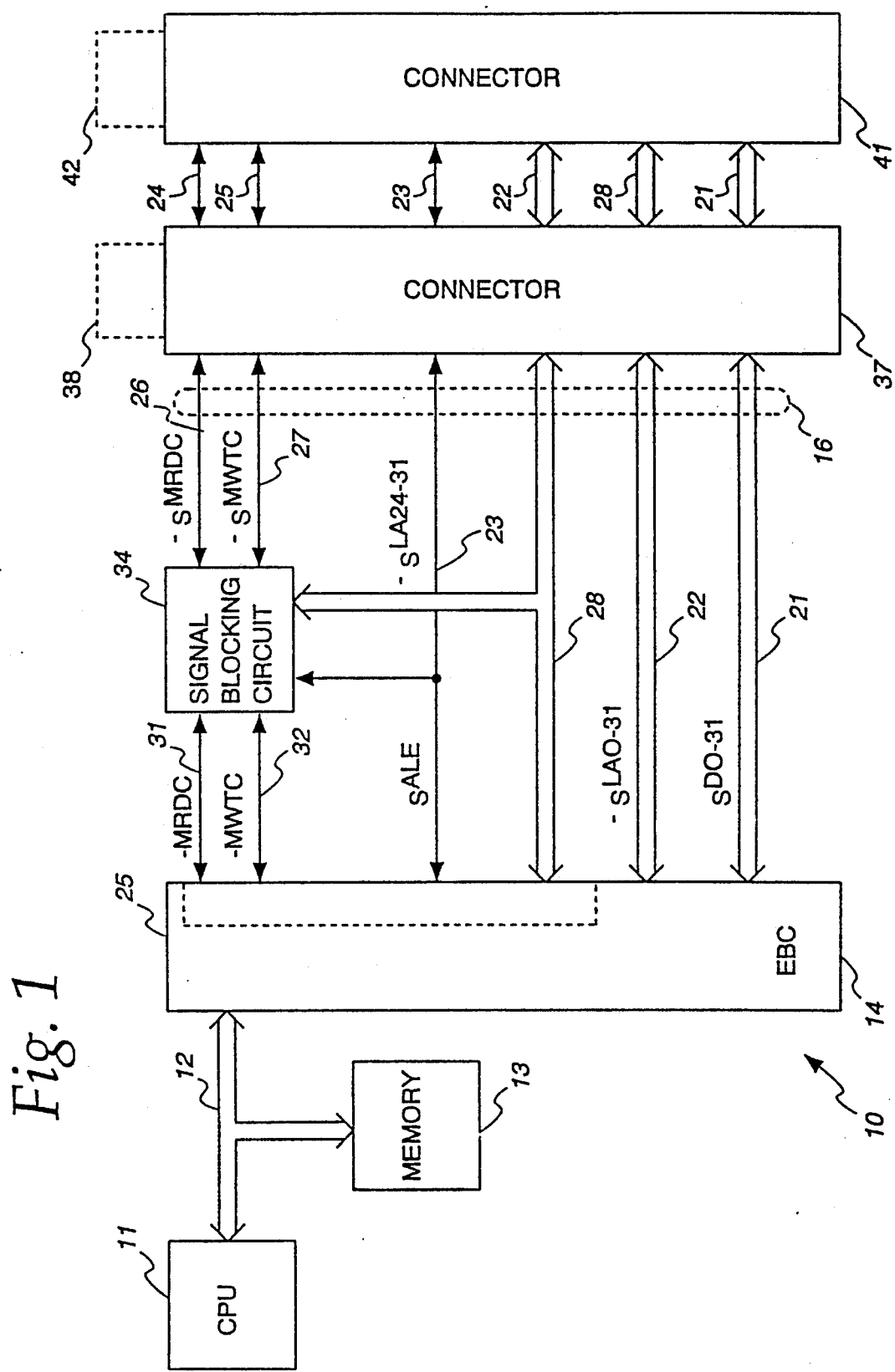
FIG. 1 is a block diagram of a computer system embodying the present invention.

FIG. 1 is a block diagram of a computer system 10 which embodies the present invention. The computer system 10 includes a central processing unit (CPU) 11 connected by a local bus 12 to a local memory 13 and to an EISA bus controller unit (EBC) 14.

The CPU 11 is, in the preferred embodiment, based on an Intel Model 80386, but in fact could be based on almost any conventional and commercially available microprocessor. The local memory 13 is also conventional in all respects, and therefore not described in further detail.

The EBC 14 is capable of controlling an EISA bus which is designated generally at 16. The mnemonic "EISA" stands for Extended Industry Standard Architecture, which is an existing industry standard. The details of this standard are set forth in a written specification which is publicly available, for example from BCPR Services, Inc. of Washington D.C., and therefore the details of the EISA standard are not described here in detail. The EISA standard is compatible with and includes enhancements to an earlier standard commonly known as ISA (Industry Standard Architecture). The ISA standard is also, in and of itself, entirely conventional, and is therefore not described in detail here.

The EISA bus 16 includes a 32-bit bidirectional data bus 21 across which data can be transferred, the lines of which are labeled sD0 to sD31. The EISA bus 16 also includes 32 address lines which are shown at 22 and labeled -sLA0 to -sLA31. (In this disclosure, a minus sign "−" in front of a signal name means that the signal is active low). A line 23 carries a signal sALE, which provides an indication of when a valid address is present on the address lines 22. Two control lines 26 and 27 carry respective signals -sMRDC and -sMWTC, which respectively indicate that a memory read from or memory write to a device conforming to the prior ISA standard is being carried out on the bus 16. The EISA bus also includes additional signals on lines 28, including control signals which indicate that the bus is carrying out a memory read from or memory write to a device conforming to the newer EISA standard. These signals on lines 28 are entirely conventional and not a part of the present invention, and are therefore not described in detail here.

The earlier ISA standard provided for twenty-four address lines, and thus memory addressing up to 16 MB (megabytes), or in other words memory addresses within the hexadecimal range 00000000-00FFFFFF. The EISA standard provides for thirty-two address lines and thus memory addressing up to 4 GB (gigabytes), or in other words memory addresses in the hexadecimal range 00000000-FFFFFFFF. Since circuit cards and other components built under the ISA standard only take into account the twenty-four least significant bits (LSBs) of the thirty-two address lines, an ISA unit designed to respond to a given ISA address could potentially respond to several EISA addresses located at 16 MB intervals, namely addresses which have the same 24 LSBs but have different combinations of the 8 MSBs. For example, a unit designed to respond to ISA memory address 111111 (hexadecimal) should respond to EISA address 00111111, but could potentially also respond to EISA addresses 01111111, 02111111, 03111111, .... FF111111. If an ISA card in fact responded to multiple memory addresses in the manner just described, errors could result. The present invention ensures that ISA cards do not respond in this manner to multiple addresses, and in particular ensures that ISA cards respond only to memory addresses in the range 00000000-00FFFFFF.

The EBC 14 includes a conventional and commercially available integrated circuit 25 which is an Intel Model 82358 and which is directly coupled to lines 23 and 28 of the EISA bus. The chip 25 can send and receive a memory read control signal -MRDC for an ISA unit and a memory write signal -MWTC for an ISA unit on respective lines 31 and 32. A signal blocking circuit 34 is provided to couple the control lines 31 and 26 and the control lines 32 and 27 in a selective manner described in more detail later. The line 23, which carries signal sALE, is connected to the signal blocking circuit 34, as are the MSBs -sLA24 to -sLA31 of the address lines 22.

The EISA bus 16 is connected to two EISA connectors 37 and 41, which each conform to a portion of the EISA specification dealing with connectors. The connectors 37 and 41 are entirely conventional, and not described in detail here. The computer system 10 preferably has a plurality of the connectors 37 and 41 which are all connected to the EISA bus 16, but for clarity only two of these connectors are shown in FIG. 1.

The connectors 37 and 41 can each removably receive a circuit card 38 or 42, which can each be an ISA circuit card conforming to the ISA standard or an EISA circuit card conforming to the EISA standard. The cards 38 and 42 are conventional and commercially available parts, and are therefore not described here in detail. The cards 38 and 42 are optional, and do not need to be present for proper operation of the system 10. Usually, the cards 38 and 42 are added to supplement a function which is inherent in the system 10, or to add a function which is not inherent in the system 10. For example, if the memory 13 does not include sufficient storage space for a particular application, a card which contains additional memory can be added.

Most conventional ISA and EISA cards which can be plugged into the connectors 37 and 41 operate only in a slave mode, under control of control signals generated on the bus 16 by the EBC 14. However, some conventional cards which can be inserted into the connectors 37 and 41 have the capability to take control of the bus 16 and to actually generate the control signals which control data transfers across the data lines 21, including the address and control signals on some or all of the lines 22, 23, 26, 27 and 28. For purposes of describing the present invention, it will be assumed hereinafter that the card 38 is a conventional ISA card having the capability to take control of the bus 16, and that the card 42 is a conventional ISA card. The transfer of bus control between the EBC 14 and the ISA card 38 is handled using handshaking on some of the control lines 28, in a manner which is conventional and therefore not described here in detail.

Turning now to the signal blocking circuit 34, its overall function will first be briefly summarized, and then its internal circuitry and its operation will be described in detail.

If the EBC 14 outputs on address bus 22 a memory address and if an EISA card designed to respond to that particular memory address is coupled to the EISA bus 16, the EISA card will produce a signal to the EBC on one of the lines 28 prior to the point in the memory access cycle where the EBC would generate the signals -MRDC and -MWTC on lines 31 and 32, and in response to this signal the circuit 25 of the EBC will not generate either of the signals 31 and 32 during that particular memory access cycle. On the other hand, if no EISA card designed to respond to that particular memory address is present, the design of the integrated circuit 25 is such that it will produce one of the signals -MRDC and -MWTC on line 31 or 32, even if the address on lines 22 is outside the ISA range, or in other words above 00FFFFFF. If the signal on line 31 or 32 were applied directly to line 26 or 27, the ISA cards 38 and 42 would respond not only to that address within the ISA range, but also to other addresses outside the ISA range, as previously described. Therefore, the signal blocking circuit 34 is provided to selectively couple line 31 to line 26 and line 32 to line 27 in a manner which ensures that ISA devices on the EISA bus 16 respond only to addresses in the ISA range (00000000-00FFFFFF). In particular, if the signal blocking circuit 34 detects a signal on either of the lines 31 and 32 when the address on lines 22 is less than or equal to 00FFFFFF, the circuit 34 causes control line 26 to be driven by control line 31 or control line 27 to be driven by control line 32, so that the control signal present on the line 31 or 32 is applied across one of the lines 26 and 27 to the ISA cards 38 and 42. On the other hand, if the circuit 34 detects a signal on one of the lines 31 and 32 when the address on lines 22 is greater than 00FFFFFF, it inhibits the application of any signal to the lines 26 and 27, as a result of which the ISA cards 38 and 42 will not respond.

If the ISA card 38 requests and receives control of the bus 16, it needs to be able to access any memory location, including memory locations in the local memory 13. Consequently, if the circuit 34 detects that a signal is being generated on one of the control lines 26 and 27, it supplies that signal to one of the lines 31 or 32 regardless of the address which is present on lines 22, and thus if the address corresponds to a location in the local memory 13 the EBC 14 can make an appropriate access to the local memory 13. (If the card 38 were an EISA card rather than an ISA card and if it received control of the bus 16, it would never directly generate signals on the lines 26 and 27. Instead, the signals it generated on lines 28 would cause EBC 14 to generate a signal on line 31 or 32 as described above if no EISA device responded to the memory address, in which case the blocking circuit 34 would determine whether the signal on line 26 or 27 should be applied to line 31 or 32.)

Figure 2:
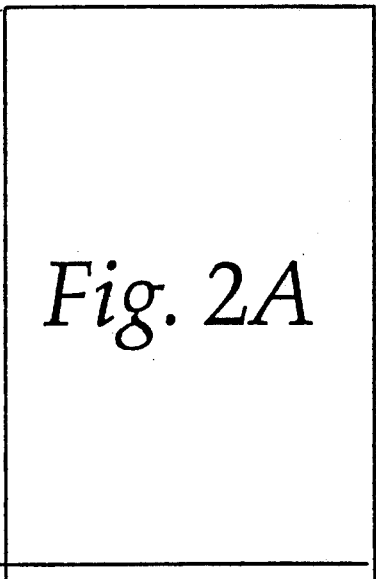
FIG. 2 collectively represent a schematic diagram of a signal blocking circuit which is a component of the computer system of FIG. 1.
Figure 2:
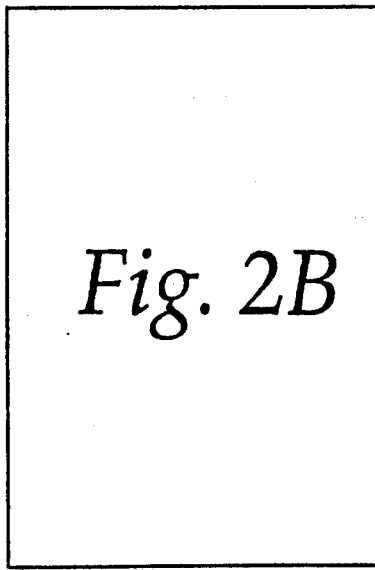
Figure 2:
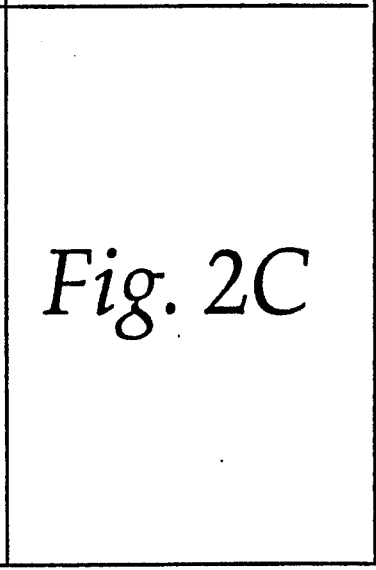
Figure 2A:
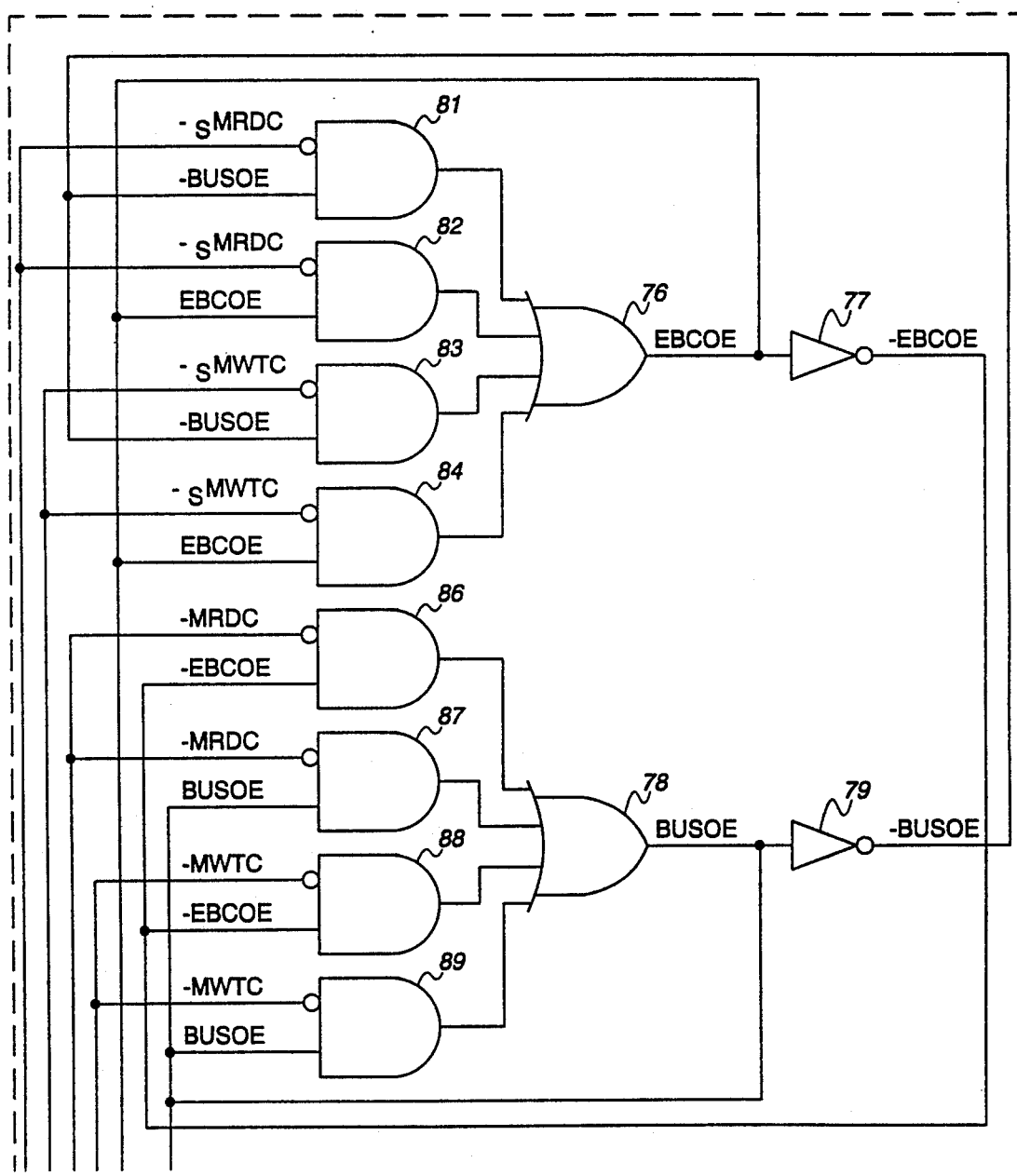
Figure 2B:
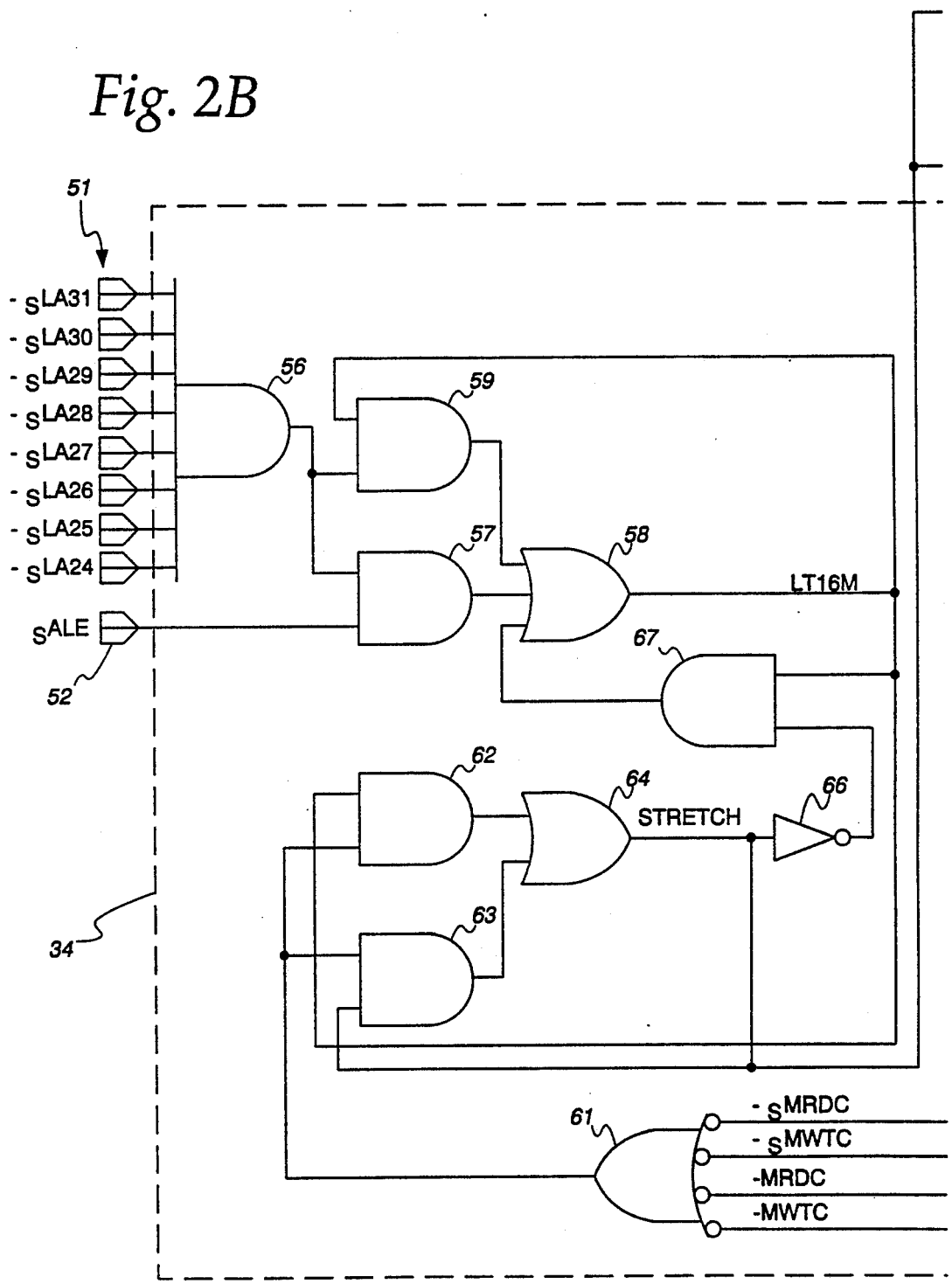
Figure 2C:
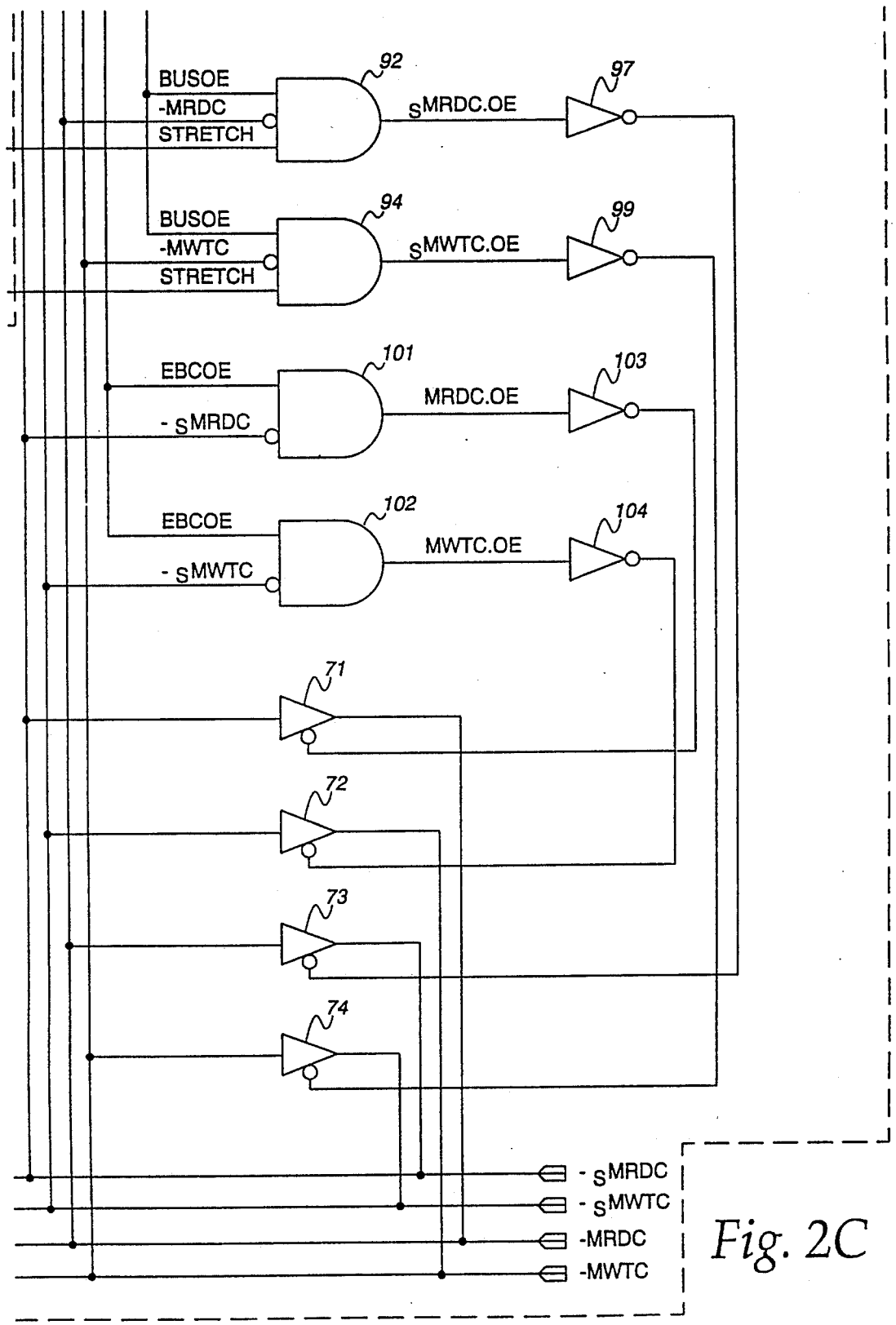

FIG. 2, collectively depict a schematic diagram of the circuitry in the signal blocking circuit 34. In the preferred embodiment, the blocking circuit 34 is implemented with a generic array logic (GAL) chip, which is Model GAL-20V8 commercially available from Lattice Semiconductor, Portland, Oregon. As those skilled in the art are aware, a GAL is a device having a collection of gates without specific interconnections, and is customized for a particular application by creating interconnections between the gates to realize a specific logic circuit. Those of ordinary skill in the art are thoroughly familiar with the manner in which a GAL is customized to implement the specific interconnections required between gates for a particular logic circuit, and a detailed discussion of that is thus unnecessary here. In this respect, it will also be recognized that certain well-known and functionally equivalent substitutions may be made without changing the function of the circuit. For example, it is well known that a two-input AND gate can be replaced with a two-input NAND gate and an inverter where the output of the NAND gate is connected to the input of the inverter.

The GAL of FIG. 2 has eight terminals 51, to which are connected the respective address lines -sLA24 to -sLA31, has a terminal 52, to which is connected the control line sALE, and has four terminals 53, to which are connected the lines 26, 27, 31 and 32 for the signals -sMRDC, -sMWTC, -MRDC and -MWTC.

In FIG. 2, the elements 71, 72, 73 and 74 are each a buffer having a data input, a control input, and a tri-state data output. The other logical circuit elements shown in FIG. 2 are conventional, and the interconnections between the circuit elements will be self-evident to those of ordinary skill in the art from FIG. 2, and these components and their interconnections are therefore not described in detail here. However, the operation of the circuit of FIG. 2 will be briefly described.

When the address lines 22 (FIG. 1) are being used to address an ISA device, the MSBs of the intended address will all be zero and thus, due to the fact that the address lines 22 are active low, the MSBs of the address lines will each be applying a logic high voltage to a respective one of the terminals 51. Consequently, all of the inputs of AND gate 56 will be high and the gate 56 will produce a high at its output. When a pulse is subsequently generated on the line sALE and is applied to the terminal 52, the AND gate 57 will have a high voltage at each input and will thus output a high voltage to the OR gate 58, so that the output LT16M of the OR gate 58 becomes a logic high voltage which is applied to one input of an AND gate 59 and one input of an AND gate 62. The two inputs of the gate 59 will thus each be high, and the gate 59 will output a high voltage to the OR gate 58, so that the signal LT16M becomes latched at a high voltage. In particular, when the brief pulse on line sALE terminates, the signal LT16M will remain at a high voltage. At this point, none of the signals -sMRDC, -sMWTC, -MRDC or -MWTC has been generated, and thus an OR gate 61, which receives these signals at its four inputs, will be applying a low voltage to an input of the AND gate 62 and an AND gate 63, so that each of the AND gates 62 and 63 will be outputting a low voltage to OR gate 64 to cause OR gate 64 to produce a low voltage on the line STRETCH, which is connected to an input of inverter 66. The inverter 66 will thus be applying a high voltage to one input of an AND gate 67, the other input of which is receiving a high voltage from the line LT16M. Thus, the gate 67 will output a high voltage which latches the signal LT16M at a high voltage. Eventually, one of the signals -sMRDC, -sMWTC, -MRDC or -MWTC will be generated, as a result of which the OR gate 61 will output a high voltage to an input of each of gates 62 and 63. The signal LT16M from gate 58 is a high voltage applied to the other input of gate 62, and gate 62 will thus output a high voltage to OR gate 64 which will then output a high voltage on the line STRETCH, causing inverter 66 to disable gate 67, which in turn outputs a low to gate 58. The address lines 22 can start to change at about this point in time and cause gate 56 to output a low to gates 57 and 59. Since OR gate 58 will then have a low at each input, its output LT16M will go low. The high output STRETCH from gate 64 is applied to a second input of AND gate 63, as a result of which gate 63 sends a high voltage to OR gate 64 to thereby latch the signal STRETCH in its high condition so long as one of the signals -sMRDC, -sMWTC, -MRDC or -MWTC is present and is causing gate 61 to enable the other input of gate 63. Thus, when an address in the ISA range is detected, the signal LT16M will become a logic high voltage to indicate that the address is within the ISA range, and the signal STRETCH will be set to a high voltage before termination of the signal LT16M in order to indicate the same thing.

The tri-state buffer 71 has its input connected to the line -sMRDC and its output connected to the line -MRDC, tri-state buffer 72 has its input connected to the line -sMWTC and its output connected to the line MWTC, tri-state buffer 73 has its input connected to the line -MRDC and its output connected to the line -sMRDC, and tri-state buffer 74 has its input connected to the line -MWTC and its output connected to the line -sMWTC.

Referring to the upper right portion of FIG. 2, at the beginning of each memory access cycle, OR gates 76 and 78 will each be outputting a logic low voltage to a respective inverter 77 or 79. Thus, the low voltage signal EBCOE from gate 76 will be applied to an input of and thus will be disabling each of gates 82 and 84. Similarly, the low voltage signal BUSOE produced by gate 78 will be applied to an input of and thus will be disabling each of gates 87 and 89. Inverter 77 will be outputting a high voltage signal -EBCOE which is applied to an input of each of gates 86 and 88, and inverter 79 will be outputting a high voltage signal -BUSOE which is applied to an input of each of gates 81 and 83. The gates 81, 83, 86 and 88 each have an input connected to a respective one of the signals -sMRDC, -sMWTC, -MRDC and -MWTC. In normal system operation, only one of the signals -sMRDC, -sMWTC, -MRDC and -MWTC is generated during any particular memory access cycle. Assume for purposes of the present explanation that a signal (active low) occurs on the line -MRDC. Before this signal reaches gate 86, gates 81-84 and 87-89 will each be outputting a logic low voltage. When this signal reaches gate 86, gate 86 will output a high voltage to OR gate 78. The high voltage from gate 86 will cause gate 78 to output a high voltage signal BUSOE and inverter 79 to output a low voltage signal -BUSOE. The signal BUSOE is applied to the inputs of gates 87 and 89, which will disable gate 89 and, since the other input of the gate 87 is receiving signal -MRDC, cause gate 87 to output a high voltage to OR gate 78 which latches the signal BUSOE at a high voltage so long as the signal -MRDC is present. The low voltage produced by inverter 79 on signal -BUSOE disables gates 81 and 83 for reasons which will be mentioned in a moment.

The high voltage produced by gate 78 on line BUSOE is applied to one input of each of two AND gates 92 and 94. The signal -MRDC is applied to an active low input of the gate 92, and the remaining input of gate 92 is connected to the line STRETCH. Assuming that the address on lines 22 is within the ISA range, line STRETCH will carry a high voltage and thus gate 92 will be enabled and will output a high voltage which, through an inverter 97, will enable the control input of tristate buffer 73 so that the control signal detected on line -MRDC will be applied through the buffer 73 to line -sMRDC. As mentioned above, inverter 79 is outputting a low voltage to an input of gate 81, as a result of which the gate 81 ignores the signal now present at its other input from line -sMRDC. This ensures that gates 76-89 detect the first occurrence of a signal on one of the lines -sMRDC, -sMWTC, -MRDC and -MWTC during a memory access cycle, and not subsequent signals on these lines which are generated by the circuit 34 itself. When the signal on line -MRDC eventually terminates, its termination will cause the circuit of FIG. 2 to return to its original state.

Assume exactly the same situation just described, except that the address on lines 22 is not within the ISA range of addresses. In this case, neither of the signals LT16M and STRETCH will occur, and thus gate 92 will not be enabled and inverter 97 will not enable the buffer 73, so that application of the signal on line -MRDC to the line -sMRDC is inhibited.

If the original signal had occurred on the line -MWTC rather than the line -MRDC, a similar sequence of events would have occurred. In particular, the gate 88 would have been enabled and would in turn enable gate 78 which would then cause gate 89 to latch gate 78 in an enabled state, the high signal BUSOE from gate 78 being applied to gates 92 and 94 and the low signal -BUSOE from inverter 79 disabling gates 81 and 83. If the address on lines 22 was outside the ISA range, the gate 94 would be disabled by a continuous low voltage on line STRETCH, whereas if the address was within the ISA range the gate 94 would be enabled and, through an inverter 99, would enable the control input of the tri-state buffer 74 to supply the signal from line -MWTC through the buffer to the line -sMWTC. The low voltage produced by inverter 79 on signal -BUSOE to disable gate 83 would cause gate 83 to ignore the signal generated on line sMWTC by the circuit 34 itself.

The manner in which signals on lines -sMRDC and -sMWTC cause the respective tri-state buffers 71 and 72 to be enabled is similar, but with one difference. In particular, the gates 101 and 102, which through the respective inverters 103 and 104 enable the respective buffers 71 and 72, do not have inputs coupled to the signal STRETCH. Therefore, the address which may be present on lines 22 has no effect at all on the control of tri-state buffers 71 and 72. In particular, the occurrence of a signal on line -sMRDC will always cause the gate 101 and inverter 103 to enable tri-state buffer 71 so that the signal -sMRDC is supplied to line -MRDC (regardless of the state of the address lines 22), and the occurrence of a signal on the line -sMWTC will always cause the gate 102 and inverter 104 to enable buffer 72 to supply the signal on line -sMWTC to line MWTC (regardless of the state of the address lines 22).

Summarizing, with reference to FIG. 1, a signal generated on the line 31 will be supplied by circuit 34 to line 26 if and only if the address on lines 22 is between 00000000 and 00FFFFFF (hexadecimal), a signal generated on the line 32 will be supplied by the circuit 34 to line 27 if and only if the address on lines 22 is between 00000000 and 00FFFFFF, a signal generated on line 26 will always be supplied by the circuit 34 to line 31 regardless of the state of the address lines 22, and a signal generated on line 27 will always be supplied by the circuit 34 to the line 32 regardless of the state of the address lines 22.

Although one preferred embodiment of the invention has been shown in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus comprising: a bus which includes a first control line and a plurality of address lines; a second control line; first means for applying an address to said address lines of said bus and for applying a control signal to one of said first and second control lines; second means selectively operable in first and second modes, wherein in said first mode said second means effects application of signals from said second control line to said first control line, and in said second mode said second means effects application of signals from said first control line to said second control line, said second means including means responsive to said address lines and said first and second control lines for causing said second means to operate in said first mode in response to sad control signal being applied to said second control line when the address on said address lines is within a predetermined group of addresses, for causing said second means to operate in a mode other than said first mode in response to said control signal being applied to said second control line when the address on said address lines is outside said predetermined group of addresses, and for causing said second means to operate in said second mode in response to said control signal being applied to said first control line regardless of the address on said address lines; wherein said second means includes first and second buffers which each have a data input, a data output and a control input, said first buffer having its data input connected to said first control line and its data output connected to said second control line, and said second buffer having its data output connected to said second control line and its data output connected to said first control line, said second means applying an actuating signal to said control input of said first buffer to effect said application of said control signal from said first control line to said second control line, and said second means applying an actuating signal to said control input of said second buffer to effect said application of said control signal from said second control line to said first control line; wherein said second means includes first gate means having an input coupled to said first control line and having an output, second gate means having an input coupled to said second control line and having an output, address monitoring means for determining whether an address present on said address lines is within said predetermined group of addresses, first detecting means coupled to said output of said first gate means and responsive to an output signal from said first gate means for disabling said second gate means and for applying said actuating signal to said control input of said first buffer, and second detecting means coupled to said address monitoring means and said output of said second gate means for disabling said first gate means and for applying said actuating signal to said control input of said second buffer in response to an output signal from said second gate means when an address on said address lines id determined by said address monitoring means to be within said predetermined group of addresses; wherein said first gate means includes a first AND gate means a first input which is said data input of said first gate means, having a second input, and having an output which is said output of said first gate means; wherein said first detecting means includes a second AND gate having a first input which is coupled to said first control line, having a second input and having an output, includes a first OR gate having two inputs which are respectively coupled to said output of said first and second AND gates and having an output, and includes a first inverter having an input coupled to said output of said first OR gate and having an output; wherein said second gate means includes a third AND gate having a first input which is said data input of said second gate means, having a second input, and having an output which is said output of said second gate means; wherein said second detecting means includes a fourth AND gate having a first input coupled to said second control line, having a second input and having an output, includes a second OR gate having two inputs respectively coupled to said outputs of said third and fourth AND gates and having an output, and includes a second inverter having an input coupled to said output of said second OR gate and having an output; wherein said output of said second OR gate is coupled to said second input of said second AND gate, said output of said first inverter is coupled to said second input of said third AND gate, said output of said second OR gate is coupled to said second input of said fourth AND gate, and said output of said second inverter is coupled to said second input of said first AND gate; wherein said first detecting means includes further means responsive to a signal at said output of said first OR gate for applying the actuating signal to said control input of said first buffer; wherein said second detecting means includes further means responsive to a signal at said output of said second OR gate when said address monitoring means has determined that an address on said address lines is within said predetermined group for applying the actuating signal to said control input of said second buffer; wherein said bus includes an address valid line; wherein said address monitoring means includes a fifth AND gate having a plurality of inputs coupled to respective most significant bits of said address lines and having an output, includes a sixth AND gate having two inputs which are respectively coupled to said output of said fifth AND gate and to said address valid line and having an output, includes a third OR gate having first, second and third inputs and having an output, said second input of said third OR gate being coupled to said output of said sixth AND gate, includes a seventh AND gate having two inputs respectively coupled to said output of said fifth AND gate and said output of said third OR gate, and having an output coupled to said first input of said third OR gate, includes a fourth OR gate having first and second inputs which are respectively coupled to said first and second control lines and having an output, includes an eighth AND gate having inputs which are respectively coupled to said output of said third OR gate and said output of said fourth OR gate, includes a ninth AND gate having a first input coupled to said output of said fourth OR gate, having a second input, and having an output, includes a fifth OR gate having two inputs respectively coupled to said outputs of said eighth and ninth AND gates and having an output coupled to said second input of said ninth AND gate, includes a third inverter having an input coupled to said output of said fifth OR gate and having an output, and includes a tenth AND gate having two inputs respectively coupled to said output of said third OR gate and said output of said third inverter and having an output coupled to said third input of said third OR gate, said further means of aid second detecting means being responsive to a signal at said output of said second OR gate occurring simultaneously with a signal at an output of said fifth OR gate for applying the actuating signal to said control input of said second buffer; wherein said further means to said first detecting means includes an AND gate having a first input coupled to said output means of said first OR gate, a second input coupled to said first control line, and an output coupled to said control input of said first buffer; and wherein said further means of said second detecting means includes an eleventh AND gate having three inputs respectively coupled to said output of said second OR gate, said second control line and said output of said fifth OR gate and having an output coupled to control input of said second buffer.

2. An apparatus as recited in claim 1, wherein said first and second buffers each have tri-state outputs.

3. An apparatus as recited in claim 1, wherein said bus includes a third control line; and including a fourth control line; wherein said first means applies said control signal to one of said first, second, third and fourth control lines; and wherein said second means includes further means selectively operable in third and fourth modes, wherein in said third mode said further means effects application of signals from said fourth control line to said third control line, and in said fourth mode said further means effects application of signals from said third control line to said fourth control line, said further means including means responsive to sad address lines and said third and fourth control lines for causing said further means to operate in said third mode in response to said control signal being applied to said fourth control line when the address on said address lines is within said predetermined group of addresses, for causing said further means to operate in a mode other than said third mode in response to said control signal being applied to said fourth control line when the address on said address lines is outside said predetermined group of addresses, and for causing said further means to operate in said fourth mode in response to said control signal being applied to said third control line regardless of the address on said address lines.

* * * * *

UNITED STATES PATENT AND TRADEMARK OFFICE
CERTIFICATE OF CORRECTION

PATENT NO. : 5 317 721
DATED : May 31, 1994
INVENTOR(S) : Thomas N. ROBINSON It is certified that error appears in the above-identified patent and that said Letters Patent is hereby corrected as shown below:

```
Column  8, line 31; change "sad" to ---said---.
           line 47; change "output" to ---input---.
Column  9, line  5; change "id" to ---is---.
           line  8; change "means" to ---having---.
           line 15; change "output" to ---outputs---.
           line 60; after "gate" delete ---,---.
Column 10, line 18; change "aid" to ---said---.
           line 21; change "an" to --the --; and
           line 23; change "to" to ---of---.
           line 25; delete "means".
           line 47; change "sad" to ---said---.
```

Signed and Sealed this

Eleventh Day of October, 1994

Attest:

BRUCE LEHMAN

*Attesting Officer*          *Commissioner of Patents and Trademarks*